United States Patent [19]

Wolf et al.

[11] 3,962,480

[45] June 8, 1976

[54] BREAD INCLUDING NUTRITIONAL AMOUNTS OF MAGNESIUM

[76] Inventors: Sidney K. Wolf, 1000 Texas Hill Road, Hillsdale, N.Y. 12529; Robert M. Cavanaugh, Box 3891, Greenville, Del. 19807

[22] Filed: July 19, 1974

[21] Appl. No.: 490,117

[52] U.S. Cl. ............................ 426/549; 426/23; 426/26
[51] Int. Cl.² .................... A21D 2/02; A21D 2/24
[58] Field of Search .................. 426/23, 26, 61, 74, 426/155, 212, 226, 345, 496, 62, 549, 653, 656

[56] References Cited
UNITED STATES PATENTS

| | | |
|---|---|---|
| 3,756,832 | 9/1973 | Wolf et al. .......................... 426/152 |
| 3,852,497 | 12/1974 | Skelcey et al. ......................... 426/74 |

*Primary Examiner*—A. Louis Monacell
*Assistant Examiner*—R. A. Yoncoskie
*Attorney, Agent, or Firm*—Larson, Taylor and Hinds

[57] ABSTRACT

Bread made from white wheat flour and having magnesium added in amounts of from about 45 to 120 mg. per six-ounce serving to restore magnesium removed from the wheat by processing into white flour. The bread also includes L-lysine monohydrochloride in amounts of from 0.5 to 6.0 parts by weight per part by weight of added magnesium, and the bread is of good commercial quality with no bitter taste.

9 Claims, No Drawings

BREAD INCLUDING NUTRITIONAL AMOUNTS OF MAGNESIUM

BACKGROUND OF THE INVENTION

This invention relates to bread. More particularly, the invention relates to bread made from white wheat flour. Still more particularly, the invention relates to such bread having magnesium added to restore at lease some of the magnesium lost from the wheat during processing to white flour. Still more particularly, the invention relates to such bread having good commercial quality and taste.

It has been known for many years that the amount of essential nutrients naturally occurring in wheat is reduced when white flour is extracted during the milling process. Extensive studies have been made which show precisely which nutrients are removed and in what amounts. Some of these nutrients are frequently added to the bread during dough making to provide a bread at least approaching the nutritional value of a whole wheat bread. While such additions have been very successful, there remain some problems and one in particular concerning magnesium. Magnesium is an essential nutrient and the U.S. Food and Drug Administration (F.D.A.) recommended adult daily allowance (U.S. RDA, hereafter referred to as RDA) is 400 milligrams (mg.). Bread made from whole wheat includes about 37% of RDA or about 148 mg. in a six-ounce serving. Standard white bread, however, includes only about 7% of RDA or 28 mg. Thus, over 80% by weight of the magnesium naturally occurring in wheat is removed by milling. We have tried to add magnesium, in the form of conventional food-grade additives, such as food-grade magnesium carbonate, and have found that there is an unacceptable bitter taste when the level of added magnesium is about 45 mg. or higher per six-ounce bread serving. Accordingly, in standard white bread, we have been unable to add as much as about 15% of magnesium RDA for a total of magnesium in such bread of only about 22% of the RDA (7% contribution from the white flour). The fact that magnesium is difficult to add to cereal grain products has also been recognized by others. In the Federal Register of Friday, Jun. 14, 1974, at page 20898, it is reported by the F.D.A. that the Committee on Food Standards and Fortification Policy of the National Academy of Sciences/National Research Council concluded that whole cereal grains contribute to the diet significant amounts of essential nutrients including magnesium. However, the Commissioner accepted the recommendation that magnesium be listed only as an optional additive until the technical feasibility of adding the specified amounts has been established. Thus, the Commissioner gave express acknowledgement of technical difficulty in incorporating significant levels of magnesium in cereal grain products.

It is an object of the present invention to provide a bread made from white flour and having a magnesium content up to that which naturally occurs in whole wheat bread. It is a further object to provide such bread having the qualities of a commercial, standard white bread.

BRIEF DESCRIPTION OF THE INVENTION

The foregoing of other objects which will be apparent to those having ordinary skill in the art, are achieved in accordance with the present invention by providing a bread made from white wheat flour, and including magnesium in an amount of 45 to 120 mg. per six ounces of the bread added to replace at least some of the magnesium lost during milling and L-lysine monohydrochloride (LMH) in an amount of from about 0.5 to about 6.0 parts by weight per part by weight of added magnesium in the bread.

DETAILED DESCRIPTION

Examples of the invention and comparative examples which are set forth below clearly illustrate the present invention. Understanding of these examples will be facilitated by a brief explanation of the various terms employed herein.

The term "added magnesium", as used herein, is intended to distinguish magnesium naturally occurring in the bread ingredients from magnesium not so naturally occurring. For example, white wheat flour contains some residual magnesium, about 7% of RDA in six ounces of bread made therefrom. Similarly, other flours or protein sources such as those derived from beans, fish, and the like, most notably soy flour, peanut flour, fish flour and the like, may make a significant contribution to magnesium content. Recent developments, including the bread disclosed in our earlier U.S. Pat. No. 3,756,832, permit rather substantial amounts of soy flour in specialty breads made principally from white wheat flour. In one such formulation, utilizing rather high soy flour levels, the magnesium contributed by the soy is about 8% of RDA in six ounces of bread. Accordingly, the total naturally occurring magnesium in six ounces of the bread is about 15% of RDA. If it is desired to bring the magnesium content up to that naturally occurring in whole-wheat bread, or 37% RDA, it is only necessary to use added magnesium in an amount of 22% RDA per six ounces of white bread. This is to be compared with the same bread without soy flour to which added magnesium in an amount of 30% RDA would be needed to bring six ounces of the bread to natural magnesium content.

The U.S. Food and Drug Administration recommended adult daily allowance of magnesium is 400 mg. The magnesium content of whole-wheat bread is 148 mg. per six ounce serving, or 37% RDA. It will therefore be understood that magnesium content of bread expressed as a percent of RDA is convertible to mg. per six ounces of bread by taking the percentage in question of the 400 mg. figure. Where milligrams are given in terms of bread weight, the opposite calculation will give conversion to % RDA.

In formulating bread, the baker does not use % RDA or weight per weight of bread: the most usual procedure is to use ingredients in weight per 100 lbs. of flour when the bread dough is made. Magnesium is added in the form of a conventional food additive, such as magnesium carbonate, and the baker adds a certain weight of the magnesium compound to the dough mixer. Accordingly, in the Examples which follow, the amount of magnesium compound added to the dough mixer will be given in the usual manner and, in addition, the amount of magnesium added, based on flour weight, will be given as well as the amount of magnesium in the bread produced.

In accordance with the invention, LMH is added to the bread formulation. As in the case of the magnesium compound, the amount added will be given relative to 100 lbs. of flour. However, in accordance with the invention, the amount of LMH added is related to the amount of added magnesium. Specifically, LMH is added in an amount of about 0.5 to 6.0 parts by weight per part by weight of added magnesium. The term "added" magnesium is used throughout the present specification and claims in the special sense explained above. Where "parts" are referred to hereinafter, parts by weight are meant in the absence of a contrary indication.

The amount of added magnesium present in the bread is between about 45 and 120 mg. per six ounces. The lower figure is the one at which we have encountered a noticeable bitter taste. Moreover, only in amounts of significantly less than about 60 mg. per six ounces of bread, can an acceptable standard white bread be obtained by conventional techniques. The bitter taste becomes still more pronounced at higher levels of, for example, at least 22% RDA. The upper figure of 120 mg. per six-ounce serving is that necessary to add to bring the total magnesium level of bread made solely with white flour (containing about 7% RDA) up to the 37% RDA figure for whole-wheat bread. For purposes of formulation, the amount of magnesium to add will generally be about 0.75–2.0 ounces of magnesium per 100 lbs. of flour (assuming that 160–180 lbs. of bread is derived from 100 lbs. of flour). This is equivalent to the addition of about 3 to 8 ounces, per 100 lbs. of flour, of a magnesium compound containing about 25% by weight magnesium, such as magnesium carbonate.

L-Lysine monohydrochloride (LMH) is added, in accordance with the invention, in an amount of from 0.5 to 6.0 parts by weight per part by weight of added magnesium. LMH is expensive and, for that reason, the amount of LMH is preferably kept low and is preferably not in excess of about 4 ounces per 100 lbs. of flour or about 0.25 weight percent of the flour, and the preferred amount of LMH in the bread is between about 0.8 and 4.5 parts per part by weight of added magnesium. Lysine is an essential amino acid and particularly useful with proteins, such as wheat protein, which is lysine deficient. However, due to the expense of LMH, it is preferably added in another and less expensive form, such as a lysine-rich protein flour, for example, soy flour. The LMH added in accordance with the present invention is thus preferably below amounts considered necessary for optimum nutritional benefit, although it may be about that amount needed to restore the quantity of this nutrient which is lost in milling to extract white wheat flour. Where the amount of LMH is substantially increased to enrichment values in excess of about 6 ounces per 100 lbs. of flour, or about 0.4 wt.%, it is preferred to reduce the amount of salt (NaCl) in the formulation to offset the saltier taste resulting from the use of the high LMH levels.

EXAMPLE I

A conventional white bread is made in a conventional commercial baking operation by the straight dough method from the following formulations:

| Brew Ingredients | Amount of Ingredient |
| --- | --- |
| Water | 68 pounds |
| Salt | 9 ounces |
| Sugar | 11 ounces |
| Yeast | 2 pounds, 8 ounces |
| Yeast food (Roland Industries: Monocalcium phosphate, salt, starch, ammonium sulfate, potassium bromate, potassium iodate, and tricalcium phosphate.) | 6.5 ounces |

The brew is left for 2–3 hours during which time the temperature rises from about 80° to 87°F with about 2.0% weight loss. The brew is then placed in the mixer with the remainder of the formulation as follows:

| Ingredient | Amount |
| --- | --- |
| Water | none |
| Flour (Peavey Co., white wheat flour, 12.25% protein) | 100 lbs. |
| Sugar | 8 lbs., 6 ounces |
| Salt | 1 lb., 6 ounces |
| Shortening (vegetable oil) | 3.0 lbs. |
| Calcium propionate | 4 ounces |
| Dough developer (Foremost Foods, Reddi-Sponge: dry whey, corn flour, monocalcium phosphate, L-cysteine hydrochloride and potassium bromate.) | 2 lbs. |
| Standard enrichment tablet (Thiamine, riboflavin, niacin, and iron.) | (Mandatory standard bread enrichment) |
| Emulsifier (glycerol monostearate) | 1 lb. |
| Emulsifier ("Xpando", a polyoxyethylene glyceride type) | 3 ounces |

The formulation is mixed for one minute at low speed and 18 minutes at high speed to clean-up. Dough temperature is 80°F. The dough is proofed for 90 minutes at 105°F at 90+% relative humidity and baked in the form of Pullman loaves at an oven temperature of 475°F for 26 minutes. This is a good, commercial quality, standard white bread.

EXAMPLE II

Bread is made in accordance with Example I except that 4 ounces, per 100 lbs. of flour, of magnesium carbonate (about 25% by weight magnesium) is added in the mixer. The bread contains about 60 mg. added magnesium per six-ounce serving. The bread is noticeably bitter but is otherwise of good commercial quality.

EXAMPLE III

Bread is made in accordance with Example I except that, per 100 lbs. of flour, 4 ounces of magnesium carbonate and 9 ounces of tricalcium phosphate (TCP) are added in the mixer. The bread contains about 60 mg. added magnesium per six-ounce serving. The bread is noticeably bitter in taste but is otherwise of good commercial quality.

EXAMPLE IV

Bread is made in accordance with Example I except that 9 ounces of TCP is added in the mixer. The bread is comparable to that of the control of Example I and has no bitter taste. This example shows that the bitter taste in the bread of Example III is apparently not caused by TCP.

EXAMPLE V

Bread is made in accordance with Example III except that 4 ounces of L-lysine monohydrochloride (LMH) are added to the mixer. Accordingly, the bread includes about 60 mg. of magnesium per six-ounce serving and 4 parts by weight of LMH per part by weight of magnesium. The bread has no bitter taste and is organ-oleptically equivalent to the commercial quality, standard white bread of Example I.

EXAMPLE VI

Bread is made in accordance with Example I except that 7 ½ ounces of magnesium carbonate (about 1.8 oz. magnesium) are added per 100 lbs. of flour in the mixer. The bread includes about 112 mg. of added magnesium per 6 ounce-serving and has a very noticeable bitter taste.

EXAMPLE VII

Bread is made in accordance with Example VI except that 15 ounces of tricalcium phosphate are added per 100 lbs. of flour in the mixer. The bread is comparable to that of Example VI and is noticeably bitter.

EXAMPLE VIII

Bread is made in accordance with Example VII except that 6 ounces of LMH are added in the mixer. The bread is not bitter and is comparable to that of Example V.

EXAMPLE IX

Bread is made in a commercial baking operation according to the straight-dough method by adding a conventional finished brew containing about 87 lbs. of water per 100 lbs. of flour to the mixer with the remaining ingredients as follows:

| | |
|---|---|
| Water | 8 lbs. |
| White wheat flour | 100 lbs. |
| Soy flour, defatted, 52% protein | 9 lbs. |
| Corn flour | 4 lbs. |
| Cellulose (Avicel PH 101, microcrystalline cellulose) | 2 lbs. |
| Carboxymethylcellulose, medium viscosity | 12 oz. |
| Yeast (additional) | 8 oz. |
| Bromate tablet | 60 ppm. KBrO$_3$ per 100 lbs. of flour |
| Salt (additional) | 1 lb., 12 oz. |
| Vegetable-oil shortening | 3 lbs. |
| "Emplex" (sodium stearoyl-2-lactylate) dough conditioner | 8 oz. |
| Honi-Mate (honey sweetener) | 8 lbs. |
| Xylose | 8 oz. |
| Calcium propionate | 4 oz. |
| Tricalcium phosphate | 1 lb., 2 oz. |
| Magnesium carbonate | 6 oz. (1.51 oz. of magnesium) |
| Vitamin and mineral pre-mix | 1 oz. |
| Roche: vitamin A palmitate, thiamine nitrate, riboflavin, niacinamide, ferrous sulfate, calciferol, pyridoxine hydrochloride, folic acid, potassium iodide, zinc oxide.) | |

The formulation is mixed for one minute at low speed and 22 minutes at high speed to clean-up. Dough temperature is 77°F. The dough is proofed as in Example I and baked in the form of two-pound Pullman loaves at 480°F for 24 minutes. The bread contains about 90 mg. of added magnesium per six-ounce serving. This is a high-protein, specialty bread which has a noticeable bitter flavor but is otherwise of commercial quality.

EXAMPLE X

A bread is made in accordance with Example IX except that 1.2 ounces of LMH per 100 lbs. flour (0.79 parts by weight of L-lysine monohydrochloride per part by weight magnesium) are added to the mix. The bread produced is of acceptable commercial quality and the flavor is good and not bitter.

EXAMPLE XI

Bread is made in accordance with Example IX except that 2.67 oz. of LMH (1.77 parts per part of magnesium) are added to the mix per 100 lbs. of flour. The bread produced is of good commercial quality, and has excellent flavor without any trace of bitter taste.

EXAMPLE XII

Bread is made in accordance with Example IX except that 4.40 oz. of LMH (2.91 parts per part of magnesium) are added to the mix per 100 lbs. of flour. The bread produced is comparable to that of Example XI.

EXAMPLE XIII

Bread is made in accordance with Example IX except that 6.80 ounces of LMH (4.50 parts per part of magnesium) are added to the mixer per 100 lbs. of flour. The bread produced is noticeably saltier in taste than the breads of Examples IX—XII but is not bitter and is otherwise comparable to the bread of those Examples.

It will be understood by those having ordinary skill in the art that the present invention is useful in incorporating magnesium in breads made from white flour of reduced magnesium content. The bread is not necessarily made from fully milled flour, nor is it necessarily made from all white flour. For example, the breads of Examples IX—XIII, are made with three flavors: white wheat flour, soy flour, and corn flour. It will be apparent that a main advantage of the invention is the restoring of magnesium lost by milling wheat flour, irrespective of the bread formulation and the bread making techniques, without introducing an unacceptable bitter taste. Conventional bread making processes, such as spongedough, straight dough, continuous mix, and the like, as well as conventional techniques and additives known to be useful in those processes, may still be used in accordance with the present invention. The only change necessary is to add the magnesium compound and the LMH at a suitable stage during preparation of the dough. As indicated in the Examples, such bitter taste is noticeable in a standard white bread at levels as low as 45 mg. per six ounces of bread. Thus, for such standard white bread, it is not possible to add magnesium such that the total magnesium content is even 22% RDA. With the present invention, using preferably low amounts of L-lysine monohydrochloride, it is possible to provide a good tasting standard white bread having a magnesium content fully restored to the 37% RDA in 6 ounces of the natural wheat bread.

What is claimed is:

1. In a bread made with wheat flour which is reduced in magnesium content relative to the wheat from which the flour is obtained, and to which magnesium has been added in an amount of from about 45 to 120 mg. per six ounces of the bread to replace magnesium removed during processing of the wheat, which magnesium renders the bread noticeably bitter in taste, the improvement wherein the bitter taste imparted by said magnesium is eliminated by including in the bread from about 0.5 to about 6.0 parts by weight of L-lysine monohydrochloride per part by weight of added magnesium.

2. An improved bread according to claim 1 wherein the bread includes from about 0.8 to about 4.5 parts of L-lysine monohydrochloride per part of added magnesium.

3. An improved bread according to claim 1 wherein the bread includes a highly proteinaceous bean or fish protein source.

4. An improved bread according to claim 3 wherein the protein comprises soy protein.

5. An improved bread according to claim 3 wherein the protein source comprises soy flour.

6. An improved bread according to claim 1 wherein the amount of magnesium added is at least about 60 mg. per six ounces of the bread.

7. An improved bread according to claim 1 wherein the added magnesium is added in the form of magnesium carbonate.

8. An improved bread according to claim 7 in which the amount of added magnesium is at least about 60 mg. per six ounces of the bread.

9. An improved bread according to claim 8 in which the L-lysine monohydrochloride is present in an amount of from about 0.8 to about 4.5 parts per part of added magnesium.

* * * * *